(12) United States Patent
Klobucar et al.

(10) Patent No.: US 7,658,606 B2
(45) Date of Patent: Feb. 9, 2010

(54) EDGE GATED INJECTION MOLDING APPARATUS

(75) Inventors: Peter Klobucar, Georgetown (CA); Denis Babin, Georgetown (CA)

(73) Assignee: Mold-Masters (2007) Limited, Georgetown (CA)

( * ) Notice: Subject to any disclaimer, the term of this patent is extended or adjusted under 35 U.S.C. 154(b) by 205 days.

(21) Appl. No.: 11/962,220

(22) Filed: Dec. 21, 2007

(65) Prior Publication Data

US 2008/0152752 A1 Jun. 26, 2008

Related U.S. Application Data

(60) Provisional application No. 60/871,668, filed on Dec. 22, 2006.

(51) Int. Cl.
*B29C 45/23* (2006.01)

(52) U.S. Cl. ............... 425/564; 264/328.9; 425/572

(58) Field of Classification Search ............ 425/562, 425/563, 564, 565, 566, 572; 264/328.9
See application file for complete search history.

(56) References Cited

U.S. PATENT DOCUMENTS

| | | | |
|---|---|---|---|
| 2,471,683 A | | 5/1949 | Halbach |
| 2,571,766 A | * | 10/1951 | Saulino ............... 425/556 |
| 4,212,624 A | | 7/1980 | Ando et al. |
| 4,662,837 A | | 5/1987 | Anderson |
| 5,494,433 A | | 2/1996 | Gellert |
| 5,851,571 A | | 12/1998 | Manner |
| 6,146,123 A | | 11/2000 | Lausenhammer et al. |
| 6,162,044 A | | 12/2000 | Babin |

(Continued)

FOREIGN PATENT DOCUMENTS

DE 36 42 343 6/1988

(Continued)

OTHER PUBLICATIONS

Extended EP Search Report from EP App 07024965.1-1253, Apr. 17, 2008.

(Continued)

*Primary Examiner*—Tim Heitbrink
(74) *Attorney, Agent, or Firm*—Medler Ferro PLLC

(57) ABSTRACT

An injection molding apparatus includes an injection manifold having an inlet and a melt channel. The manifold melt channel branches to a plurality of melt channel outlets. A hot runner injection nozzle includes an axial melt channel extending along a central axis and communicating with one of the manifold melt channel outlets. The nozzle further includes at least two angled melt channels disposed at an angle to the central axis. At least two nozzle tips are provided, and each includes a nozzle tip melt channel in communication with one of the angled melt channels. A valve pin is disposed at least partially within the axial melt channel coaxially with the central axis and movable within the axial melt channel. Lateral valve pins movable within the nozzle tip melt channels are disposed at an angle to the valve pin. Linkage elements continuously connect the lateral valve pins to the valve pin. Axial movement of the valve pin is transmitted through the linkage elements to the lateral valve pins to open and close communication between the nozzle tip melt channels and the lateral mold gates.

32 Claims, 13 Drawing Sheets

U.S. PATENT DOCUMENTS

| | | |
|---|---|---|
| 6,245,279 B1 | 6/2001 | Kalemba |
| 7,192,270 B2 * | 3/2007 | Babin .................... 425/572 |
| 2003/0224086 A1 | 12/2003 | Olaru |
| 2004/0009259 A1 | 1/2004 | Manner |
| 2005/0019444 A1 | 1/2005 | Sicilia et al. |
| 2005/0196486 A1 | 9/2005 | Babin et al. |
| 2006/0082031 A1 | 4/2006 | Dewar |
| 2006/0233911 A1 | 10/2006 | Spuller |
| 2006/0257521 A1 | 11/2006 | Spuller |
| 2008/0160125 A1 | 7/2008 | Fairy |

FOREIGN PATENT DOCUMENTS

| | | |
|---|---|---|
| EP | 0186413 A2 | 7/1986 |
| EP | 0186413 A3 | 7/1986 |
| EP | 0447573 B1 | 8/1995 |
| JP | 11-2277573 | 10/1999 |
| JP | 2002-283409 | 10/2002 |

OTHER PUBLICATIONS

Extended EP Search Report in EP App 07024965.0-1253, Apr. 25, 2008.

"Hot Runner System Solves Side Valve Gating Problems", *British Plastics & Rubber* Oct. 1, 2006.

"Manner SideGate—Valve Gate Nozzle For Side Injection", *Manner Brochure* May 2006.

* cited by examiner

EDGE GATED INJECTION MOLDING APPARATUS

CROSS-REFERENCE TO RELATED APPLICATIONS

This application claims the benefit of U.S. provisional patent application No. 60/871,668 filed Dec. 22, 2006, which is hereby incorporated by reference in its entirety herein.

BACKGROUND OF THE INVENTION

1. Field of the Invention

The present invention relates generally to an injection molding apparatus and, in particular, to a valve pin mechanism for use in an edge-gated injection molding apparatus.

2. Related Art

Edge gating from a nozzle of an injection molding apparatus through a number of edge gate tips is well known. A multi-cavity edge, or side, gated injection molding apparatus is described in U.S. Pat. No. 5,494,433 to Gellert, issued Feb. 27, 1996, which is incorporated in its entirety herein by reference thereto. Generally, the multi-cavity edge-gated injection molding apparatus includes several nozzles that are coupled to a manifold to receive a melt stream of moldable material therefrom. Each nozzle is mounted in a cylindrical opening in a mold to convey pressurized melt through a nozzle melt channel to mold gates, which lead to mold cavities in the mold. The mold cavities are spaced radially around the nozzle. Each mold gate extends through a gate insert, which is held in position by a gate insert retainer plate. Each mold gate is aligned with a gate seal that is threadably coupled to the nozzle. As such, the location of the gate seals is generally fixed relative to the mold.

A multi-cavity edge gated injection molding apparatus with a first nozzle, a nozzle link, and a second nozzle is described in U.S. Published Application Publication No. 2005-0196486 A1, published Sep. 8, 2005, which is incorporated in its entirety herein by reference thereto. U.S. Published Application Publication No. 2005-0196486 does not disclose a valve pin mechanism for opening and closing communication to the mold gates.

An edge gated injection molding nozzle including a valve pin mechanism is disclosed in U.S. Published Patent Application Publication No. 2006-0233911 A1 to Spuller, published Oct. 19, 2006. However, the nozzle of the Spuller publication includes a nozzle melt channel on either side of the valve pin. In such an arrangement, melt distributed to the cavities on either side of the valve pin travel different distances, and may therefore lead to a melt flow imbalance towards the lateral gates.

SUMMARY OF THE INVENTION

According to an embodiment of the present invention, an injection molding apparatus includes an injection manifold having an inlet and a melt channel. The manifold melt channel branches to a plurality of melt channel outlets. A hot runner injection nozzle includes an axial melt channel extending along a central axis and communicating with one of the manifold melt channel outlets. The nozzle further includes at least two angled melt channels disposed at an angle to the central axis. At least two nozzle tips are provided, and each includes a nozzle tip melt channel in communication with one of the angled melt channels. A valve pin may be disposed at least partially within the axial melt channel coaxially with the central axis and movable within the axial melt channel. Lateral valve pins movable within the nozzle tip melt channels are disposed at an angle to the valve pin. Linkage elements continuously connect the lateral valve pins to the valve pin. Axial movement of the valve pin is transmitted through the linkage elements to the lateral valve pins to open and close communication between the nozzle tip melt channels and the lateral mold gates.

The nozzle includes a first nozzle portion and a second nozzle portion. In one embodiment, the first and second nozzle portions are separate pieces and are joined by a nozzle link. In such an embodiment, the axial melt channel is disposed in the first nozzle portion and the angled melt channels are disposed in the second nozzle portion. The nozzle link also includes a melt channel that is aligned with the axial melt channel. In another embodiment, the first nozzle portion and the second nozzle portion are integral. The axial melt channel is disposed in the first nozzle portion and the angled melt channels are disposed in the second nozzle portion.

The nozzle is heated. The first and second nozzle portions may be heated by a single heater or may be heated by independently controlled heaters.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
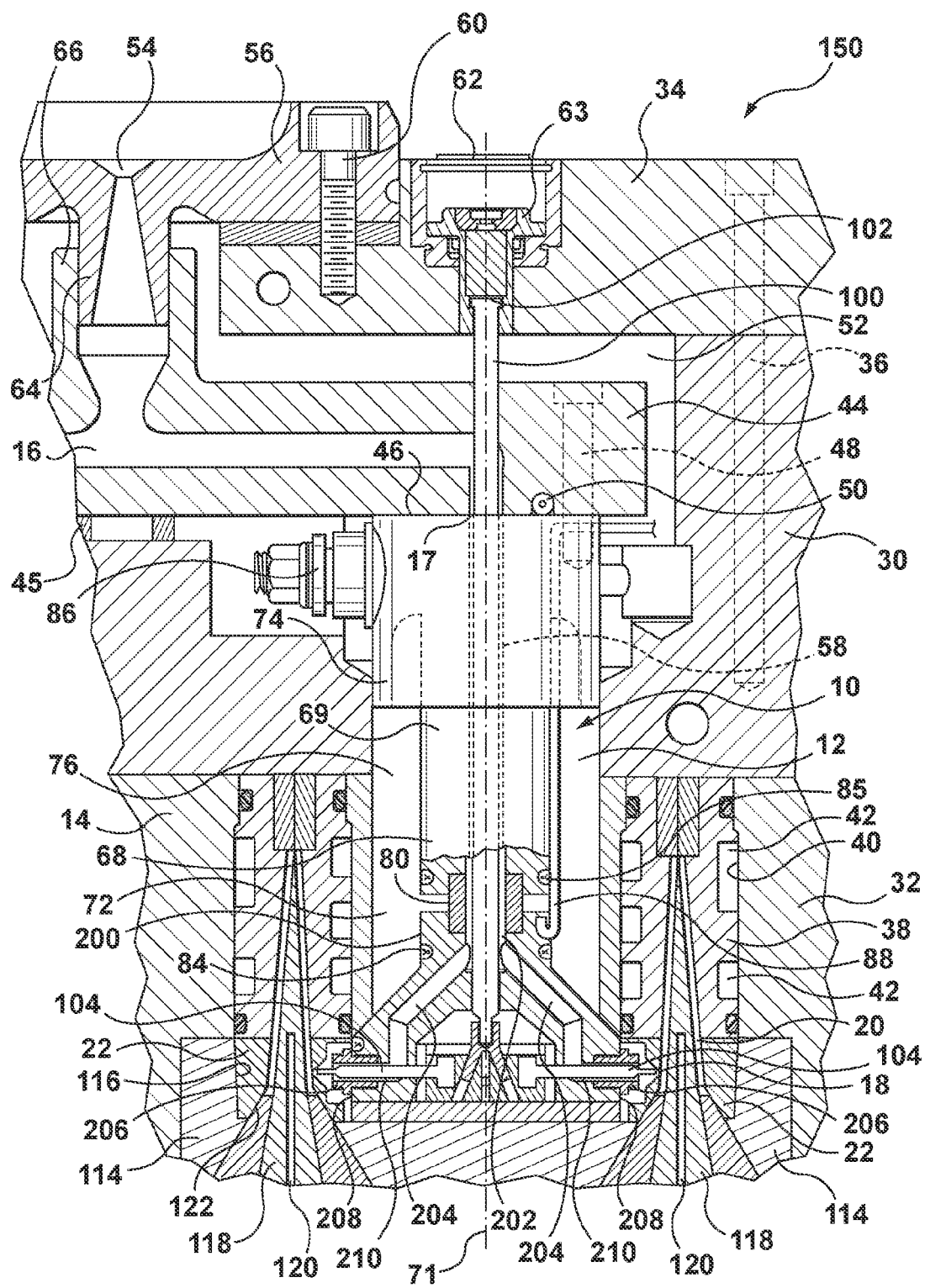
FIG. 1 is a partial cross-sectional view of a portion of an injection molding apparatus according to an embodiment of the present invention.
Figure 2:
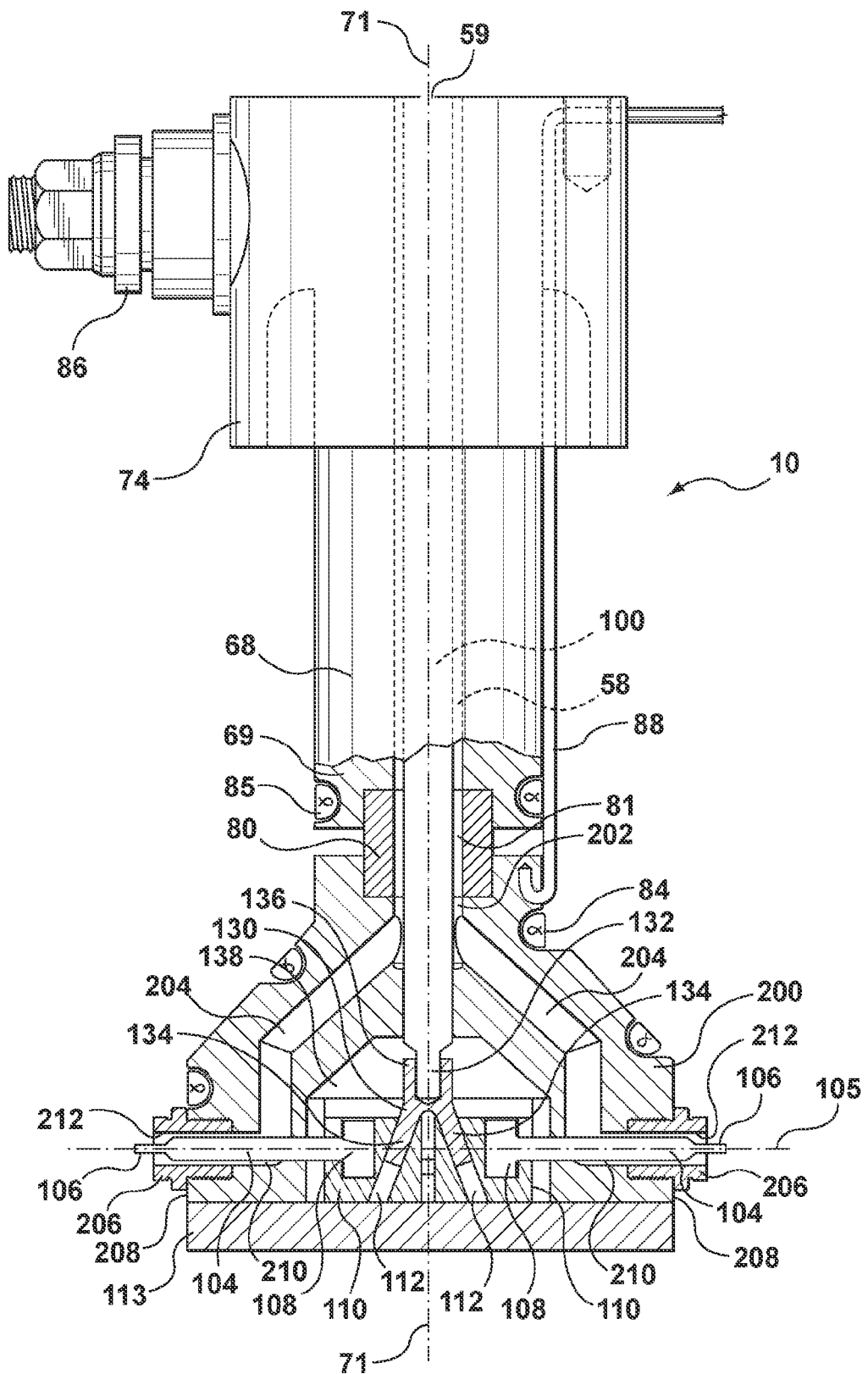
FIG. 2 is a partial cross-sectional view of a nozzle of FIG. 1 with the valve pins in the open position.
Figure 3:
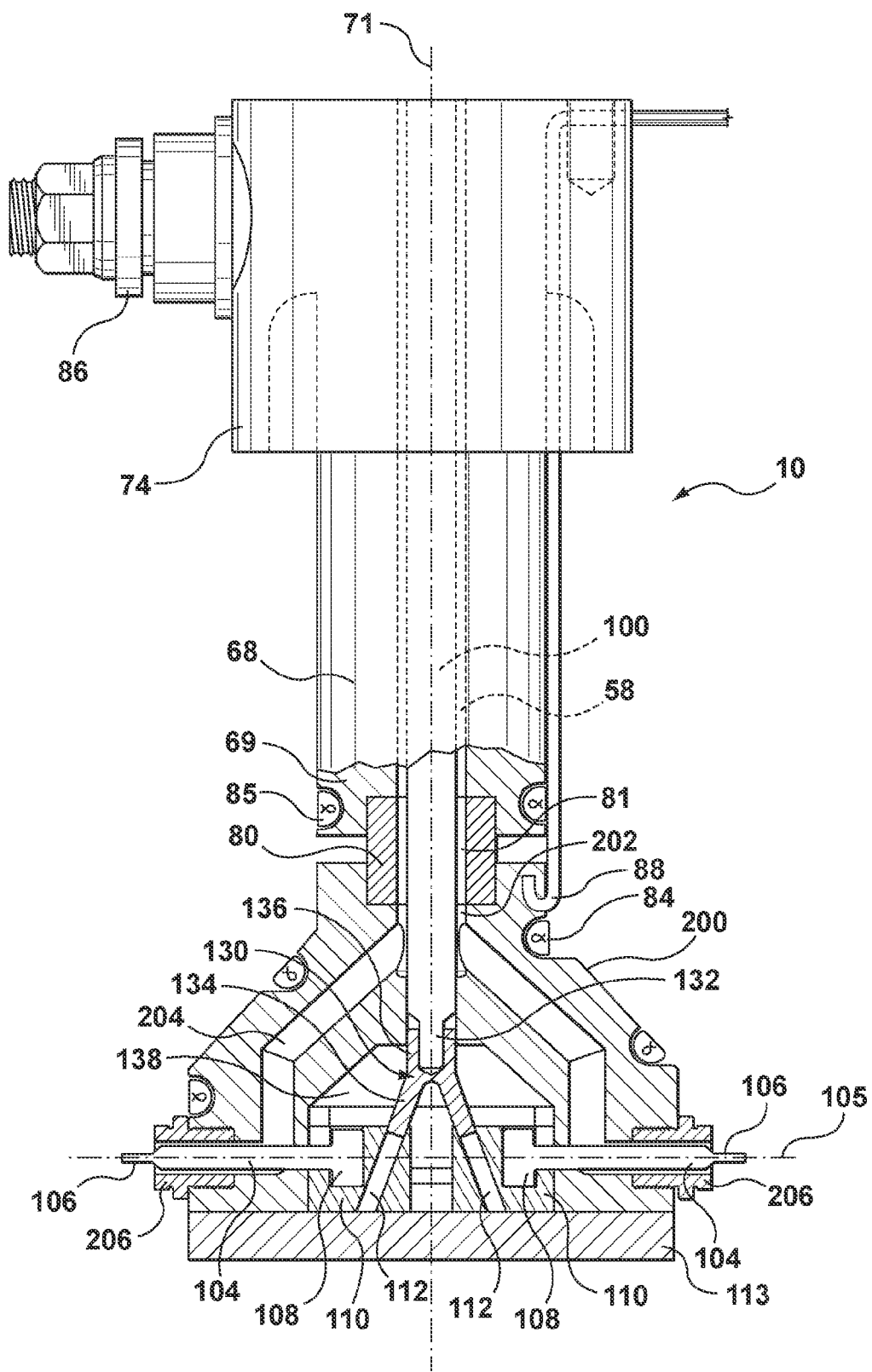
FIG. 3 is a partial cross-sectional view of the nozzle of FIG. 2 with the valve pins in the closed position.

A partial sectional view of an injection molding apparatus in accordance with the present invention is illustrated in FIG. 1 and is generally indicated by reference numeral 150. FIGS. 2 and 3 show an enlarged view of a nozzle 10 of injection molding apparatus 150 of FIG. 1. Injection molding apparatus 150 includes a melt distribution manifold 44 that is located between a spacer plate 30 and a back plate 34. While molds have a wide variety of configurations, in this case spacer plate 30 is mounted between a cavity plate 32 and back plate 34 which are secured together by bolts 36 in a conventional manner. Spacer plate 30 and cavity plate 32 are aligned by dowel pins (not shown). Manifold 44 is supported on the spacer plate 30 by a locating and supporting ring 45. Manifold 44 includes a branched melt channel 16 and is heated by an integral electrical heating element 50. An insulative air space 52 is provided between manifold 44 and the surrounding cooled spacer plate 30 and back plate 34.

Melt channel 16 receives melt from a molding machine (not shown) through a central inlet 54 in a locating ring 56 seated in back plate 34. Locating ring 56 is secured in place by bolts 60 which extend through an insulation ring. Locating ring 56 has a sprue stem 64 projecting into a cylindrical inlet portion 66 of heated manifold 44 to allow for movement of manifold 44 during installation and to provide for thermal expansion and contraction.

A plurality of nozzles 10 are coupled to the manifold 44 (only one is shown in FIG. 1 for simplicity). In the embodiment shown in FIGS. 1 and 2, nozzle 10 includes a first nozzle portion 68, a second nozzle portion 200, and a nozzle link 80 coupling the first nozzle portion 68 and the second nozzle portion 200. In this embodiment, the first nozzle portion 68 is coupled to the manifold 44 by bolts 48 (one shown), which provide a mechanical connection and a melt sealing means/force between the first nozzle portion 68 and manifold 44. First nozzle portion 68 includes a flange portion 74. In other embodiments, the flange portion 74 can sit on a corresponding shoulder portion of the spacer plate 30, which can act to limit axial movement of the rear-mounted first nozzle portion 68 in the direction of the second nozzle portion 200 and can further obviate the need for bolts 48. During operation, the nozzle flange and mold plate shoulder arrangement would support the load from manifold 44 while still allowing the load from manifold 44 to be used as a sealing means/force between first nozzle portion 68 and manifold 44.

First nozzle portion 68 includes a first nozzle melt channel 58 extending therethrough along a central longitudinal axis 71. Melt channel 58 includes an inlet 59 that is aligned with an outlet 17 of manifold melt channel 16. A nozzle body 69 of first nozzle portion 68 extends through an opening 12 which extends through spacer plate 30 and a cavity plate 32. A nozzle heater 85 is coupled about nozzle body 69 of first nozzle portion 68 to provide heat thereto. In the embodiment shown in FIGS. 1-3 nozzle heater 85 is embedded in a groove in an outer surface of nozzle body 69, although those skilled in the art would recognize that other ways to heat melt within melt channel 58 may be used. The nozzle heater 85 is in communication with a power source (not shown) through an electrical connector 86. A thermocouple (not shown) is coupled to first nozzle portion 68 to provide temperature measurements thereof.

Second nozzle portion 200 is shown coupled to first nozzle portion 68 by nozzle link 80. Second nozzle portion 200 includes a second nozzle melt channel 202 with a plurality of melt passages 204 that extend at an angle from a forward end of second nozzle melt channel 202. Angled melt passages 204 are angled to guide a melt stream toward radially extending melt passages 210 that branch out from angled melt passages 204 to deliver melt through mold gates 18 to a series of mold cavities 20. Mold cavities 20 are radially spaced around nozzle tips/gate seals 206 coupled to a front surface 208 of second nozzle portion 200. Second nozzle portion 200 is substantially conical as shown, although other arrangements of internal components can lead to other practical shapes. A nozzle heater 84 is coupled to the second nozzle portion 200 to provide heat thereto. In the embodiment of FIGS. 1-3, nozzle heater 84 is embedded in grooves provided in an outer surface of second nozzle portion 200, although those skilled in the art would recognize that other ways to heat melt within melt channel 202 and angled melt passages 204 may be used. The nozzle heater 84 is in communication with a power source (not shown) through an electrical connector (not shown). A thermocouple 88 is coupled to second nozzle portion 200 to provide temperature measurements thereof. In the embodiment of FIGS. 1-3, first nozzle portion 68 and second nozzle portion 200 are heated by the independent heaters 85, 84 that can be independently controlled to precisely control the heat profile of the melt. However, as would be understood by one of ordinary skill in the art, a single heater may be used for both first and second nozzle portions 68, 200. Such a single heater can have a wire portion that loosely bridges the gap between the first and second nozzle portions 68, 200, so that the first and second nozzle portions 68, 200 can be separated to allow the nozzle link 80 to be easily removed. Alternatively, the single heater may have a connector to allow separation of the first and second nozzle portions 68, 200.

Nozzle tips or gate seals 206 threadably engage second nozzle portion 200 and include melt passages 212 to deliver melt from radial melt passages 210 to mold cavities 20 via mold gates 18. Each nozzle tip/gate seal 206 is longitudinally fixed in position relative to each respective mold gate 18 and mold cavity 20. Nozzle tips/gate seals 206 shown in FIGS. 1 and 2 are of a one-piece construction, however, one of ordinary skill in the art would recognize that two-piece nozzle tips/gate seals may be used.

Further details regarding first nozzle portion 68, second nozzle portion 200, and nozzle link 80 can be made similar to those provided in U.S. Published Patent Application Publication No. 2005-0196486 A1, the entirety of which is incorporated herein by reference.

A melt stream of molten material is delivered under pressure from a machine nozzle (not shown) to manifold channel 16 of manifold 44. The melt is distributed from manifold channel 16 to nozzle melt channels 58 of a plurality of first nozzle portions 68. The melt flows from the nozzle melt channels 58, through melt passages 81 of nozzle links 80 and into the second nozzle melt channels 202. The melt then flows through angled melt passages 204, through radial melt passages 210, through melt passages 212 of gate seals 206, past gates 18 and into a respective mold cavity 20. Once the injection portion of the cycle is complete, the molded parts are cooled and ejected from the mold cavities.

In the embodiment shown in FIG. 1, several elongated cavities 20 are spaced around each nozzle 10 and each gate 18 extends through a gate insert 22 seated in the mold 14. In this arrangement, each elongated cavity 20 extends partially in the gate insert 22 and partially in a cavity insert 38 against which the gate insert 22 is securely mounted. A number of the cavity inserts 38 are spaced around each nozzle 10 in holes 40 in the cavity plate 32. Cooling water is pumped through cooling conduits 42 extending around each cavity insert 38 to provide cooling between the heated nozzle 10 and the cavities 20.

A gate insert retainer plate 114 has recesses 116 therein in which the gate inserts 22 are received. This holds the gate inserts 22 in place. The recesses 116 in the gate insert retainer plate 114 and the inserts 22 are tapered to provide for easy assembly and ensure a tight fit. Cavity cores 118 with central cooling conduits 120 are secured in place extending through a hole 122 in each gate insert 22 into the adjacent cavity insert 38.

In order to control flow of the melt from manifold 44, through nozzle 10, and into mold cavities 20, a valve pin system is provided. As shown in FIG. 1, an actuator 62 is disposed in an opening in back plate 34. Actuator 62 can be a hydraulic actuator, a pneumatic actuator, or an electrical actuator, as would be apparent to one of ordinary skill in the art. A head 102 of a valve pin 100 is coupled to a piston 63 of actuator 62. Valve pin 100 extends from actuator 62, through manifold 44, including a portion of manifold melt channel 16, through first melt channel 58 of first nozzle portion 68, through link melt channel 81 of nozzle link 80, and through second nozzle melt channel 202 of second nozzle portion 200, as shown in FIGS. 1 and 2. Valve pin 100 is disposed within and coaxial with melt channels 58, 81, and 202.

Further, lateral valve pins 104 are provided at least partially within radial melt passages 210 and through melt passages 212 of gate seals 206. Lateral valve pins 104 include a tip portion 106 to engage gate 18 to shut off flow to the respective cavity 20. Lateral valve pins 104 also include a head portion 108 that is seated in a slider 110. Each slider 110 is coupled to valve pin 100 such that axial movement of valve pin 100 along central axis 71 results in lateral movement of lateral valve pins 104 along an axis 105 disposed at an angle with respect to central axis 71 such that the axes are not parallel. In the particular embodiment shown in FIGS. 1 and 2, axis 105 is perpendicular to central axis 71. However, one of ordinary skill in the art would understand that axis 105 can be disposed at various angles with respect to central axis 71 ranging from 1 degree to 179 degrees. Sliders 110 shown in FIGS. 1 and 2 include a slot 112 disposed at an angle with respect to central axis 71. Further, a Y-shaped linkage element 130 is coupled to an end 132 of valve pin 100 and disposed in slots 112. In particular, Y-shaped linkage element 130 includes a head portion 136 coupled to end 132 of valve pin 100 and arms 134 disposed in slots 112 of sliders 110. Sliders 110 are movable within an opening 138 between second nozzle portion 200 and a plate 113. Plate 113 is secured to second nozzle portion 200 using blots (not shown), as further described with respect to FIGS. 6 and 7, below.

Thus, when valve pin 100 is moved towards plate 113, as shown in FIGS. 1 and 2, Y-shaped linkage element 130 is pushed downward in slots 112. Such action causes the sliders 110 to move towards each other, thereby moving lateral valve pins 104 towards central axis 71. Such movement of lateral valve pins 104 towards central axis 71 causes tip portions 106 of lateral valve pins 104 to move away from respective gates 18 such that melt can flow into respective cavities 20. Moving piston 63 of actuator 62 away from manifold 44 causes valve pin 100 to move away from retainer plate 113. Such movement of valve pin 100 thereby causes Y-shaped linkage element 130 to move upward with valve pin 100, thereby causing arms 134 to move upward and act on slots 112. Such movement causes sliders 110 to move apart from each other, thereby moving lateral valve pins 104 away from central axis 71 and towards gates 18. Tip portion 106 of each lateral valve pin 104 thereby engages gate 18 to shut off flow to the respective cavity 20, as shown in FIG. 3.

Figure 4:
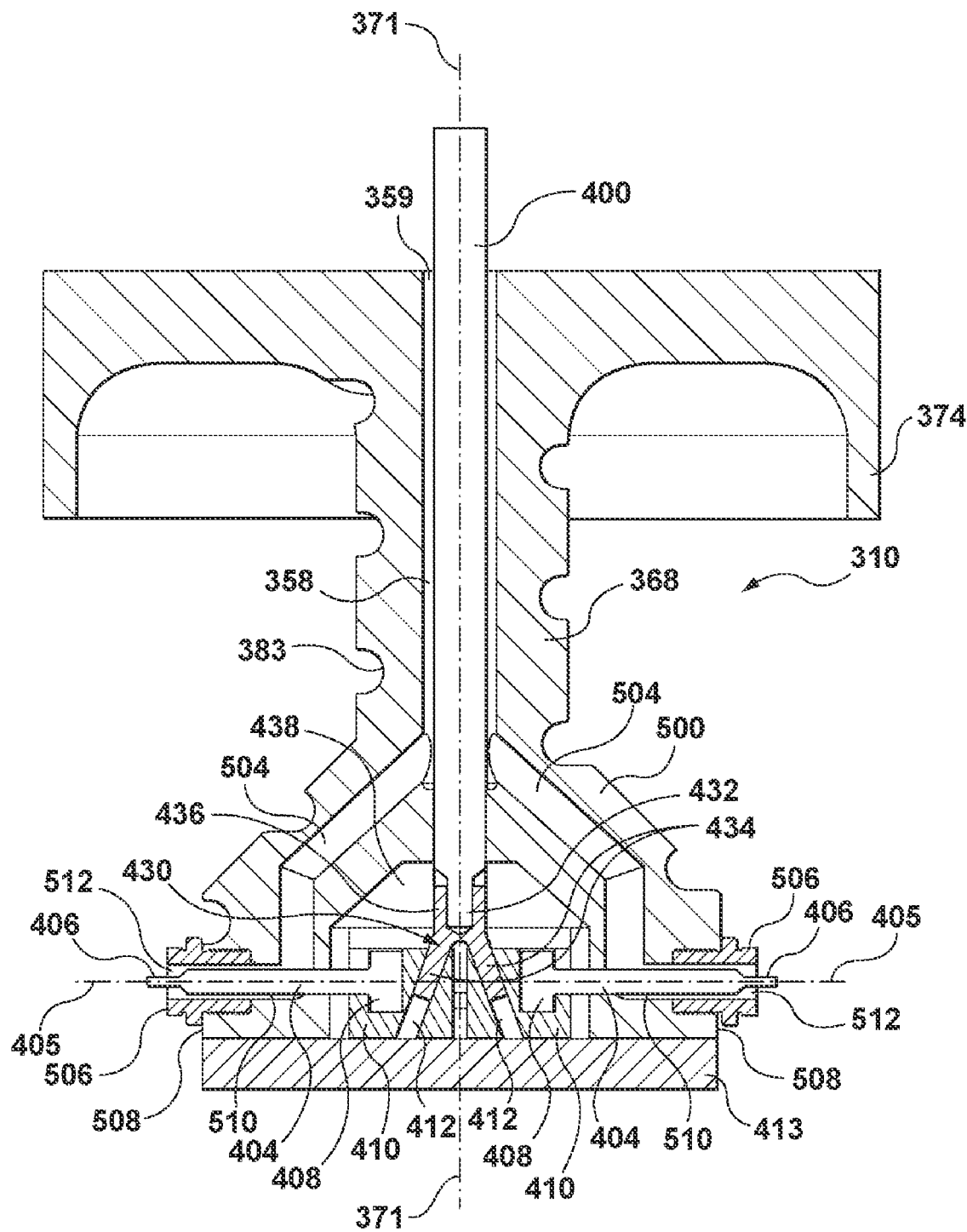
FIG. 4 is cross-sectional view of another embodiment of a nozzle with the valve pins in the open position.
Figure 5:
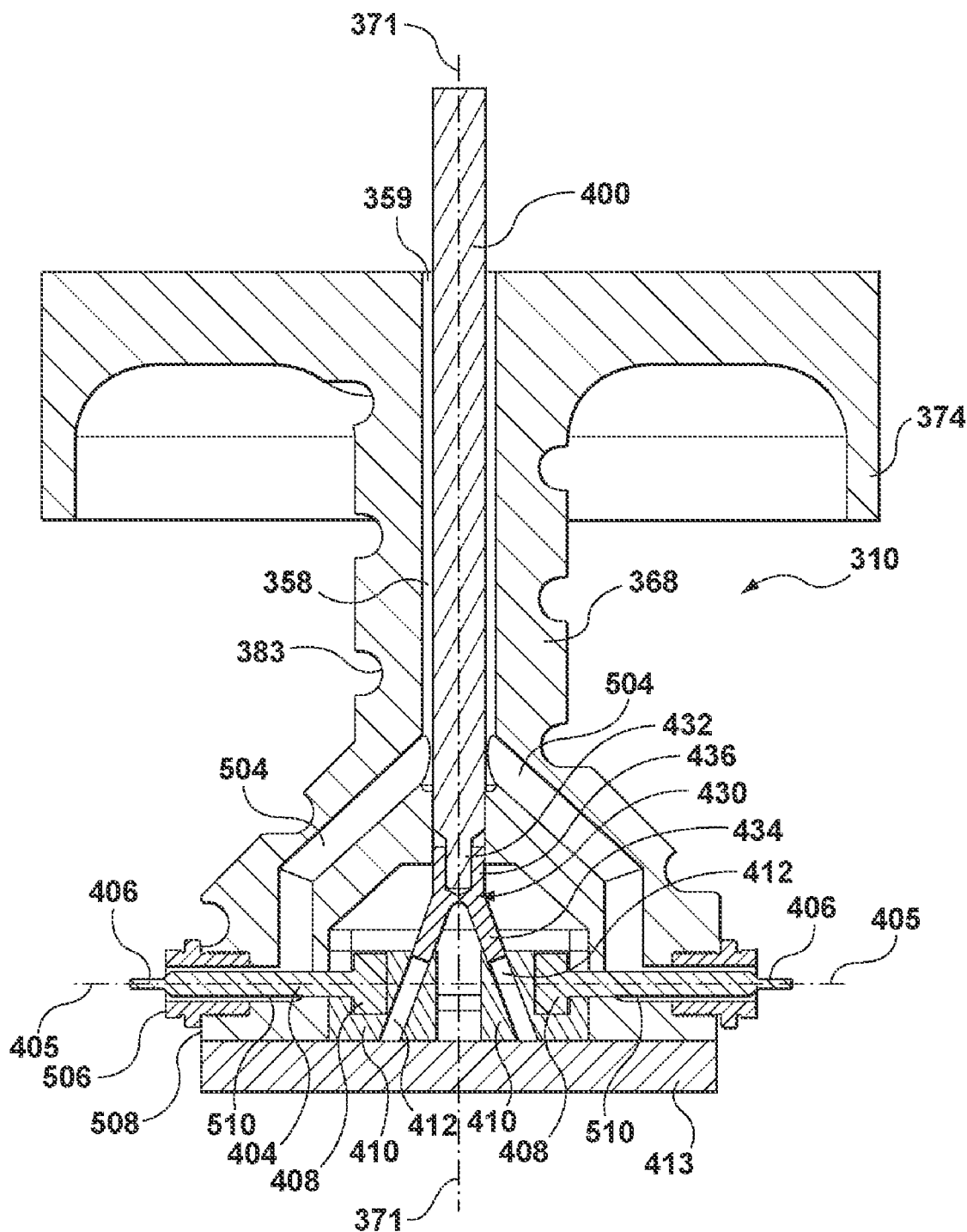
FIG. 5 is a cross-sectional view of the nozzle of FIG. 4 with the valve pins in the closed position.

FIGS. 4 and 5 show another embodiment of a nozzle 310 made in accordance with the present invention. Nozzle 310 is used in an injection molding apparatus such as the injection molding apparatus 150 shown in FIG. 1. Nozzle 310 is similar to nozzle 10 shown in FIGS. 1-3 except that nozzle 310 does not include separate nozzle pieces coupled together, such as first nozzle portion 68 and second nozzle portion 200 coupled via nozzle link 80, as shown in FIGS. 1-3. Instead, nozzle 310 is a unitary piece.

In the embodiment shown in FIGS. 4 and 5, nozzle 310 includes a first nozzle portion 368 and a second nozzle portion 500. First and second nozzle portions 368, 500 are unitary. Nozzle 310 further includes a flange portion 374 similar to flange portion 74 described above with respect to FIG. 1.

Nozzle 310 includes an axial melt channel 358 extending therethrough along a central axis 371. Melt channel 358 includes an inlet 359 that is aligned with an outlet of a manifold melt channel, as described with respect to FIG. 1. Nozzle 310 includes a nozzle heater (not shown) disposed in groove 383. The nozzle heater is in communication with a power source (not shown) through an electrical connector (not shown), as shown in FIG. 1. A thermocouple (not shown) is coupled to nozzle 310 to provide temperature measurements thereof.

Melt channel 358 of nozzle 310 branches into angled melt passages 504 in second nozzle portion 500. Angled melt passages 504 extend at an angle from a forward end of melt channel 358. Angled melt passages 504 are angled to guide a melt stream toward radially extending melt passages 510 that branch out from angled melt passages 504 to deliver melt through mold gates to a series of mold cavities, as described with respect to FIG. 1. Nozzle tips/gate seals 506 are coupled to a front surface 508 of second nozzle portion 500.

Nozzle tips/gate seals 506 threadably engage second nozzle portion 500 and include melt passages 512 to deliver melt from radial melt passages 510 to the mold cavities via the mold gates. Each nozzle tip/gate seal 506 is longitudinally fixed in position relative to each respective mold gate and mold cavity. Nozzle tips/gate seals 506 shown in FIGS. 4 and 5 are of a one-piece construction, however, one of ordinary skill in the art would recognize that two-piece nozzle tips/gate seals may be used.

A melt stream of molten material is delivered from a manifold channel of a manifold to nozzle melt channel 358 through inlet 359. The melt flows from the nozzle melt channel 358, through angled melt passages 504, through radial melt passages 510, through melt passages 512 of nozzle tips/gate seals 506, past the mold gates and into a respective mold cavity. Once the injection portion of the cycle is complete, the molded parts are cooled and ejected from the mold cavities.

In order to control flow of the melt from the manifold, through nozzle 310, and into the mold cavities, a valve pin system is provided. Although not shown in FIGS. 4 and 5, such a valve pin system includes an actuator as described with respect to FIG. 1. A valve pin 400 includes a head (not shown) coupled to the actuator, as described with respect to FIG. 1. Valve pin 400 extends from the actuator, through the manifold, including a portion of the manifold melt channel, and through nozzle melt channel 358, as shown in FIGS. 4 and 5. Valve pin 400 is disposed within and coaxial with melt channel 358.

Further, lateral valve pins 404 are provided at least partially within radial melt passages 510 and through melt passages 512 of nozzle tips/gate seals 506. Lateral valve pins 404 include a tip portion 406 to engage a respective gate to shut off flow to the respective cavity. Lateral valve pins 404 also include a head portion 408 that is seated in a slider 410. Each slider 410 is coupled to valve pin 400 such that axial movement of valve pin 400 along central axis 371 results in lateral movement of lateral valve pins 404 along an axis 405 disposed at an angle with respect to central axis 371 such that the axes are not parallel. In the particular embodiment shown in FIGS. 4 and 5, axis 405 is perpendicular to central axis 371. However, one of ordinary skill in the art would understand that axis 405 can be disposed at various angles with respect to central axis 371 ranging from 1 degree to 179 degrees. Sliders 410 shown in FIGS. 4 and 5 include a slot 412 disposed at an angle to central axis 371. Further, a Y-shaped linkage element 430 is coupled to an end 432 of valve pin 400 and disposed in slots 412. In particular, Y-shaped linkage element 430 includes a head portion 436 coupled to end 432 of valve pin 400 and arms 434 disposed in slots 412 of sliders 410. Sliders 412 are movable within an opening 438 between second nozzle portion 500 and a plate 413.

Thus, when valve pin 400 is moved towards plate 413, as shown in FIG. 4, Y-shaped linkage element 430 is pushed downward in slots 412. Such action causes the sliders 410 to move towards each other, thereby moving lateral valve pins 404 towards central axis 371. Such movement of lateral valve pins 404 towards central axis 371 causes tip portions 406 of lateral valve pins 404 to move away from respective gates such that melt can flow into respective cavities. Moving the piston of the actuator (as shown in FIG. 1) away from the manifold causes valve pin 400 to move away from plate 413. Such movement of valve pin 400 thereby causes Y-shaped linkage element 430 to move upward with valve pin 400, thereby causing arms 434 to move upward and act on slots 412. Such movement causes sliders 410 to move apart from each other, thereby moving lateral valve pins 404 away from central axis 371 and towards the gates. Tip portion 406 of each lateral valve pin 404 thereby engages the gate to shut off flow to the respective cavity, as shown in FIG. 5.

Figure 6:
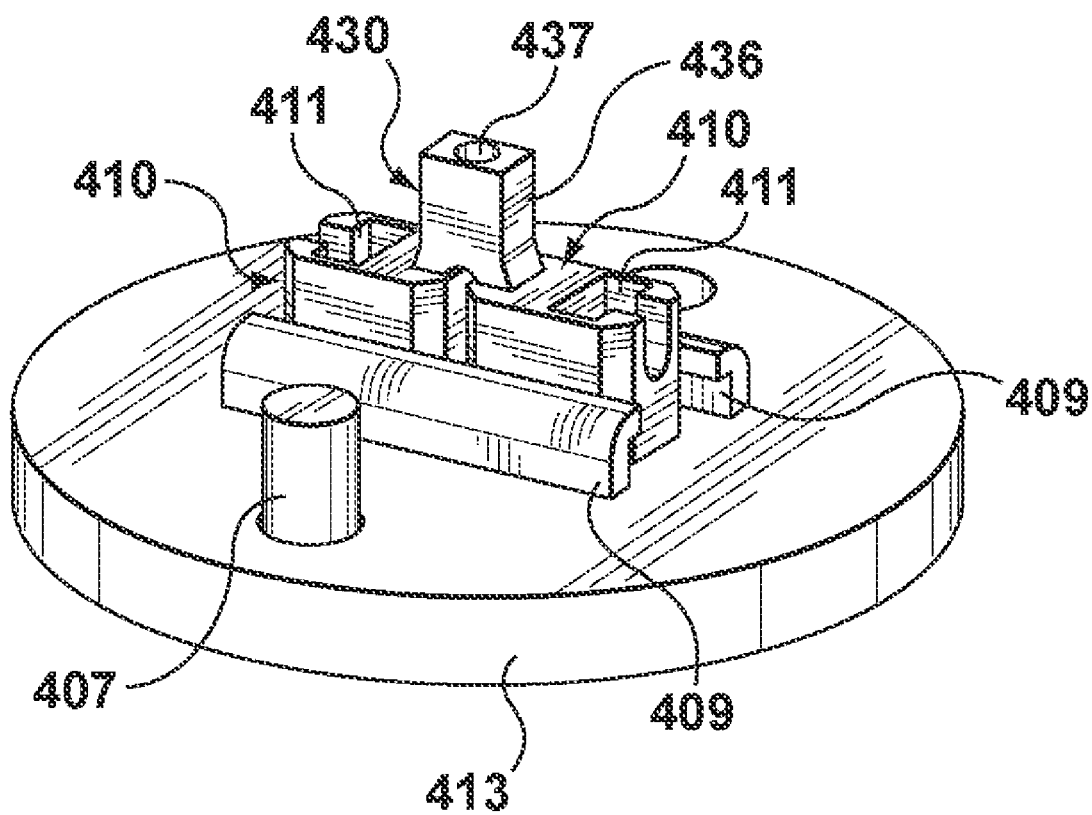
FIG. 6 is perspective view of the linkage elements of a valve pin mechanism.
Figure 7:
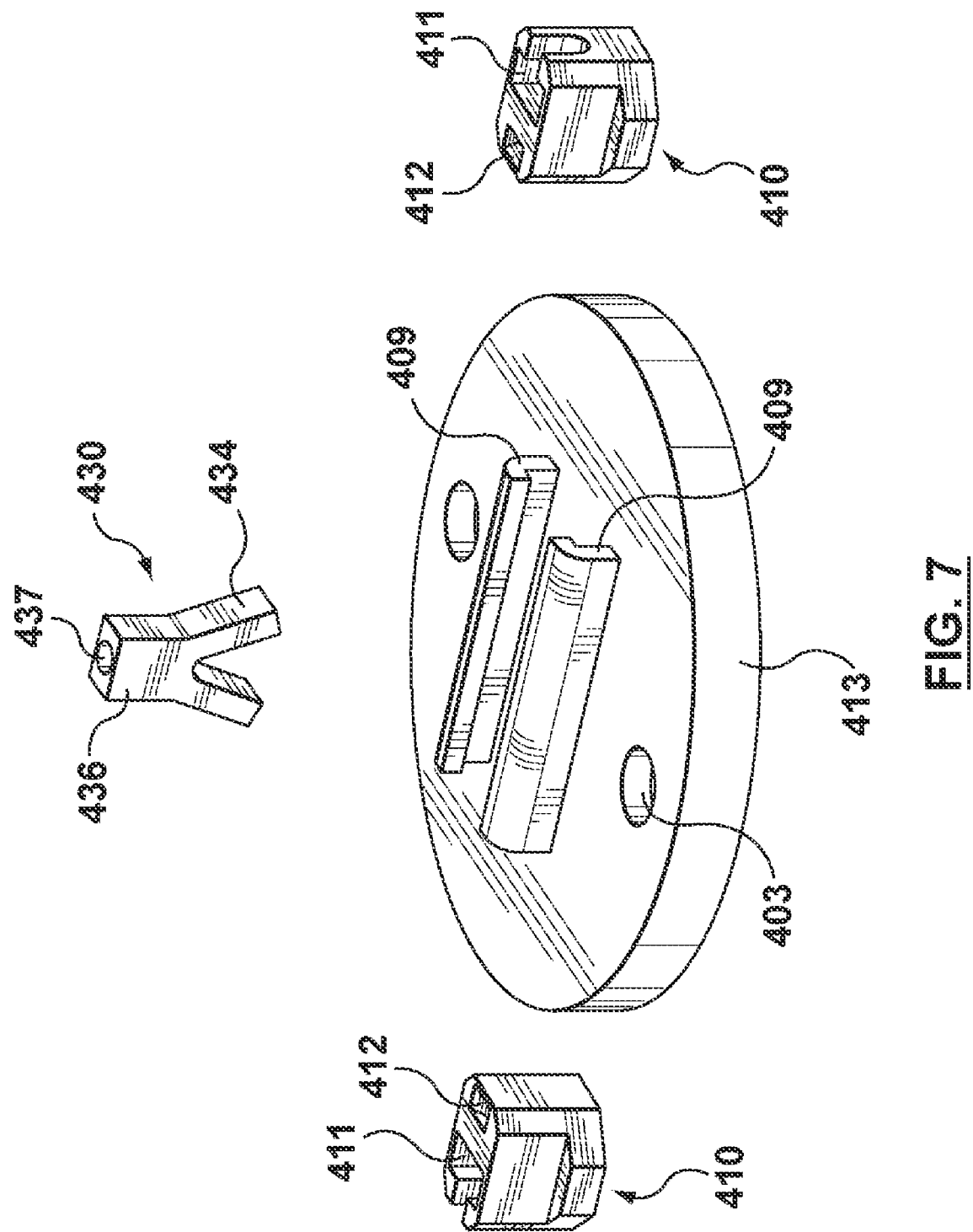
FIG. 7 is a perspective view of the linkage elements of FIG. 6.
Figure 8:
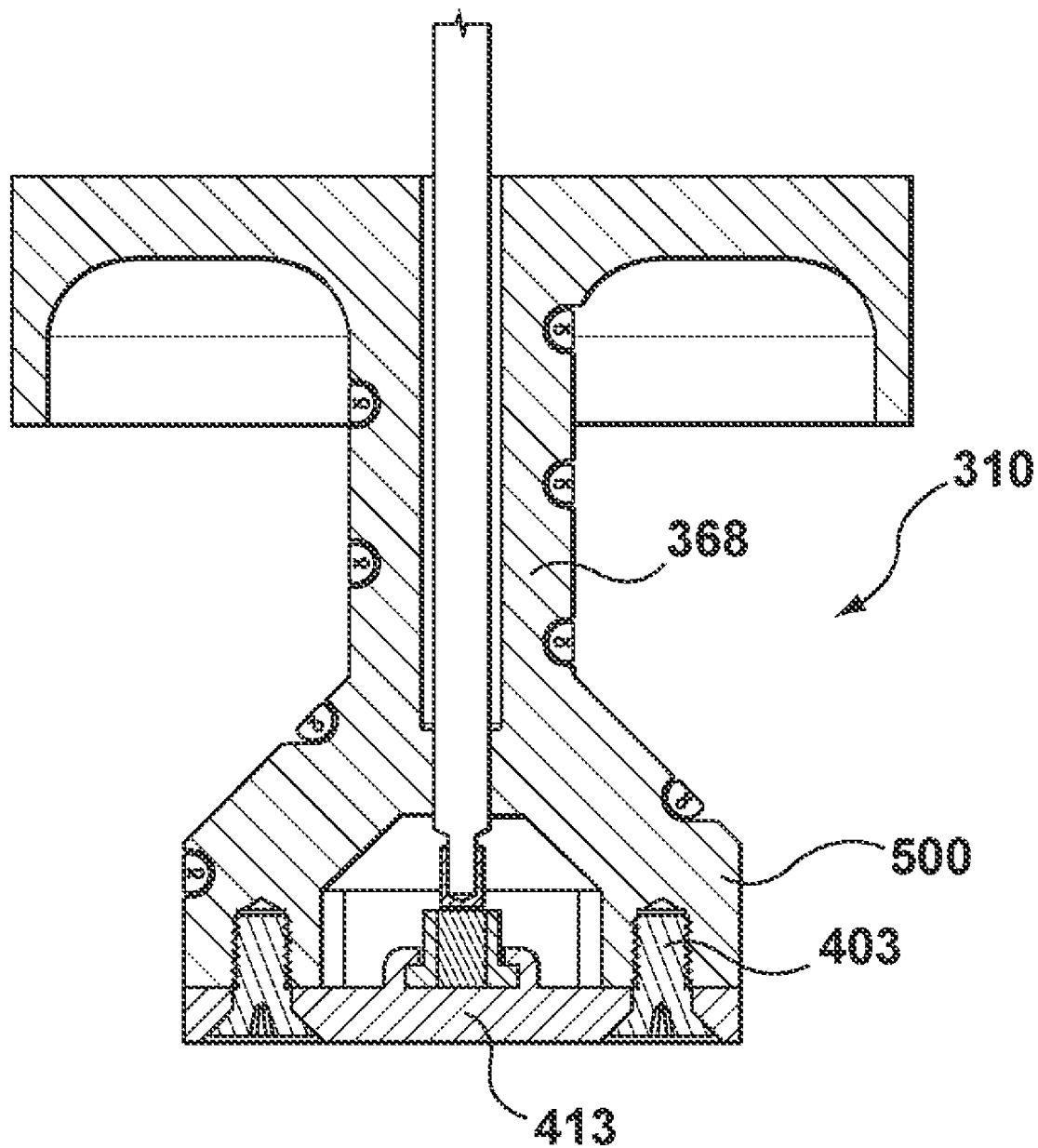
FIG. 8 is a cross-sectional view of the nozzle of FIG. 4.

FIGS. 6 and 7 show detailed views of the plate 113, 413, sliders 110, 410, and Y-shaped linkage element 130, 430 shown in FIGS. 1-5. For convenience of description, the reference numerals used in FIGS. 4 and 5 will be used in FIGS. 6 and 7, although one of ordinary skill in the art would recognize that the description is also applicable to FIGS. 1-3. As shown in FIGS. 6 and 7, plate 413 includes rails 409 disposed substantially parallel to axis 405. Sliders 410 are disposed between rails 409, which serve to limit movement of the sliders 410 to be along the axis 405. Y-shaped linkage element 430 is disposed above sliders 410 such that arms 434 of Y-shaped linkage element 430 are disposed in slots 412 of sliders 410, as shown in FIG. 6. Each slider 410 further includes a notch 411 for securing head 408 of lateral valve pin 404. Y-shaped linkage element 430 also includes an opening 437 for coupling to end 432 of valve pin 400. The opening 437 and the end 432 of valve pin 400 are preferably both threaded for engagement; however thermal bonding, such as brazing or welding, can be used if removability of the valve pin is unimportant. Each slider 410 and Y-shaped linkage element 430 combine to form a linkage between a respective lateral valve pin 404 and valve pin 400. Plate 413 further includes openings 403 for bolts 407 to go through to retain plate 413 against second nozzle portion 500, as shown in FIG. 8.

It would be understood by those of ordinary skill in the art that although two nozzle tips, gates, and cavities are shown associated with each nozzle 10, 310, any number of tips, gates, and cavities may be utilized. For example, and not by limitation, for nozzle tips, gates, and cavities may be associated with a nozzle of the injection molding apparatus. In such an arrangement, four (4) lateral valve pins would be utilized. Further, the Y-shaped linkage element would not be Y-shaped, but would instead include four (4) arms extending from the head portion thereof to engage within slots of four sliders. Similar modification can be made to accommodate other quantities of gates and cavities, as would be understood by those of ordinary skill in the art.

Figure 9:
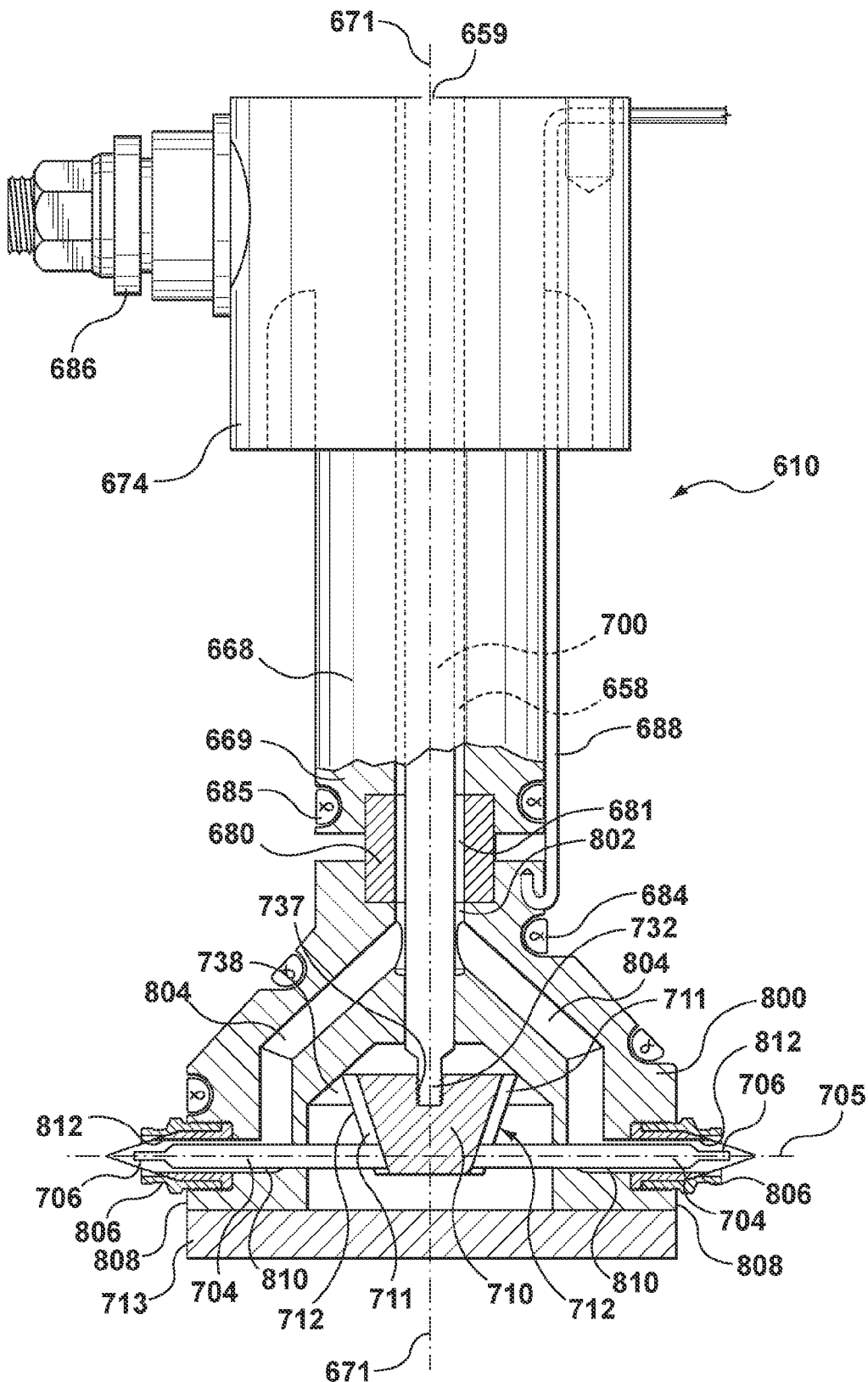
FIG. 9 is a partial cross-sectional view of another embodiment of a nozzle with the valve pins in the open position.
Figure 10:
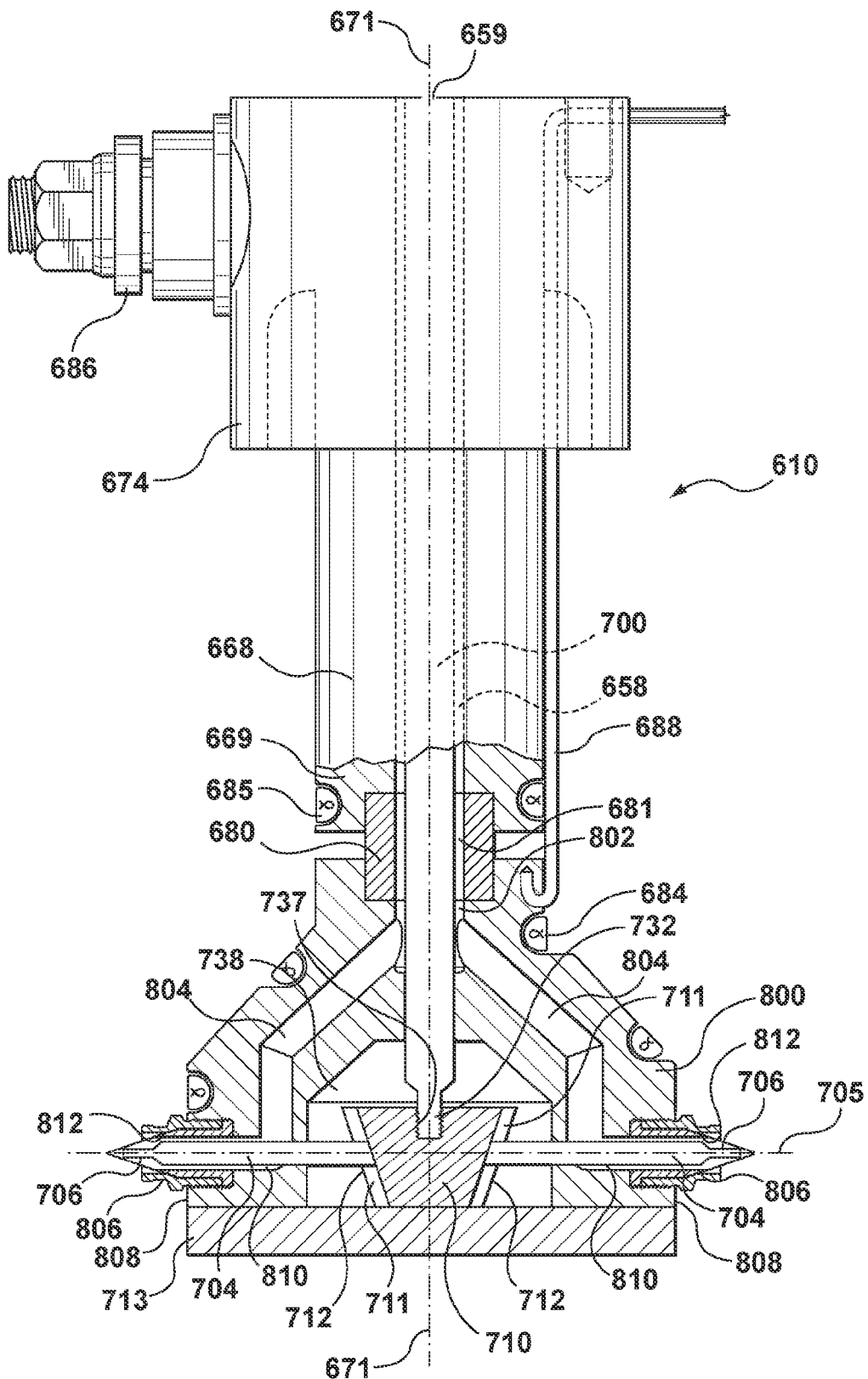
FIG. 10 is a cross-sectional view of the nozzle of FIG. 9 with the valve pins in the closed position.
Figure 11:
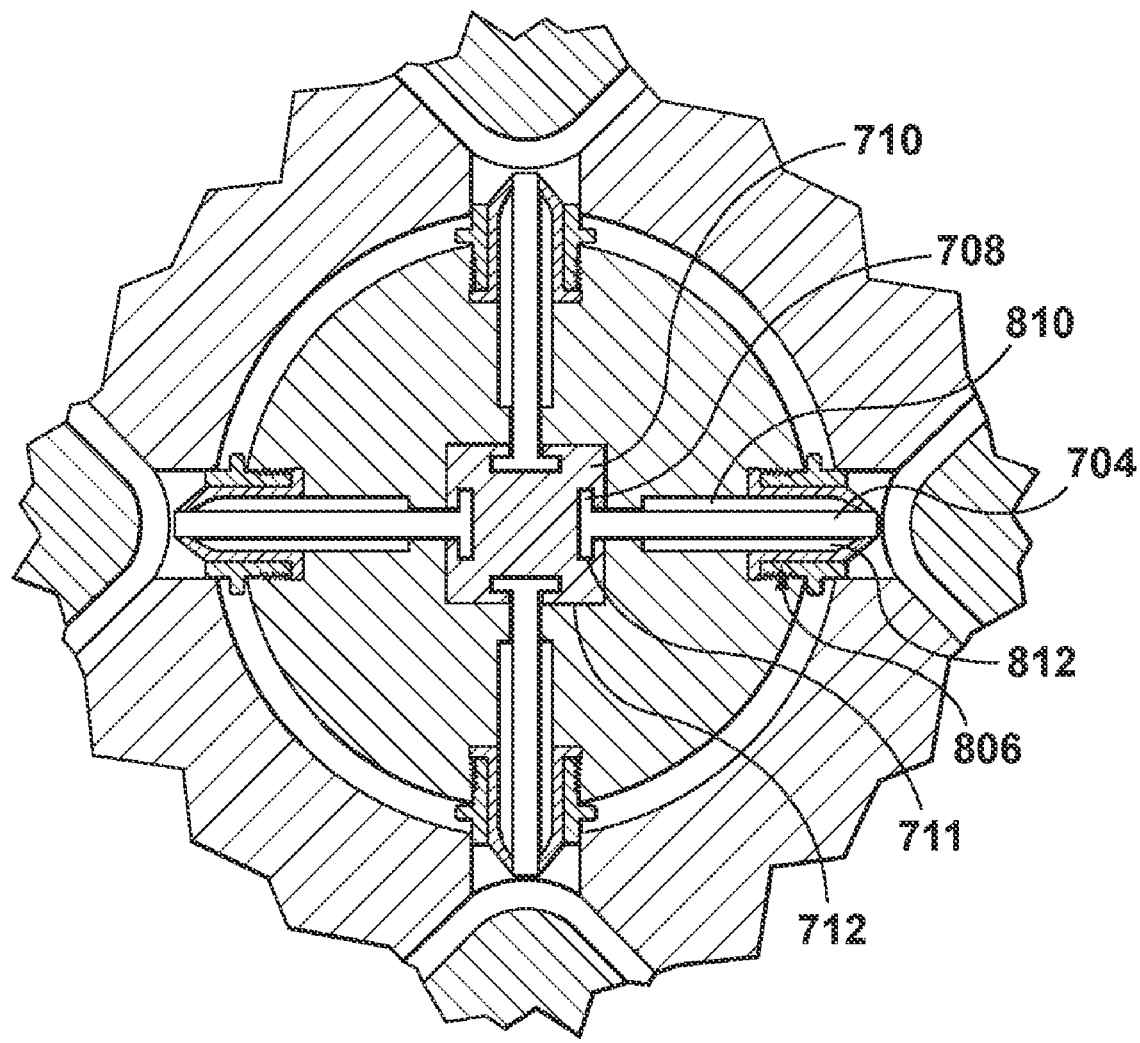
FIG. 11 is a cross-sectional view of the linkage elements of FIG. 9.

FIGS. 9-11 show a nozzle 610 made in accordance with another embodiment of the present invention. Nozzle 610 is used in an injection molding apparatus such as the injection molding apparatus 150 shown in FIG. 1. Nozzle 610 is similar to nozzle 10 shown in FIGS. 1-3 in that it includes a first nozzle portion 668 and a second nozzle portion 800 coupled via a nozzle link 680. However, it would be understood by one of ordinary skill in the art that a unitary nozzle such as nozzle 310 shown in FIGS. 4 and 5 can also be used.

In this embodiment, the first nozzle portion 668 is coupled to a manifold such as manifold 44 shown in FIG. 1. First nozzle portion 668 can be coupled to the manifold by bolts or other means, as described above with respect to FIGS. 1-3. First nozzle portion 668 includes a flange portion 674, as described above with respect to the embodiment of FIGS. 1-3.

First nozzle portion 668 includes a first nozzle melt channel 658 extending therethrough along a central longitudinal axis 671. Melt channel 658 includes an inlet 659 that is aligned with an outlet of a manifold melt channel. A nozzle body 669 of first nozzle portion 668 extends through an opening which extends through a spacer plate and a cavity plate, as described above with respect to FIG. 1. A nozzle heater 685 is coupled about nozzle body 669 of first nozzle portion 668 to provide heat thereto. In the embodiment of FIGS. 9-11, nozzle heater 685 is embedded in grooves provided in an outer surface of nozzle body 669, although those skilled in the art would recognize that other ways to heat melt within melt channel 658 may be used. The nozzle heater 685 is in communication with a power source (not shown) through an electrical connector 686. A thermocouple (not shown) may be coupled to first nozzle portion 668 to provide temperature measurements thereof.

Second nozzle portion 800 is shown coupled to first nozzle portion 668 by nozzle link 680. Second nozzle portion 800 includes a second nozzle melt channel 802 with a plurality of melt passages 804 that extend at an angle from a forward end of second nozzle melt channel 802. Angled melt passages 804 are angled to guide a melt stream toward radially extending melt passages 810 that branch out from angled melt passages 804 to deliver melt through mold gates to a series of mold cavities. The mold cavities are radially spaced around nozzle tips/gate seals 806 coupled to a front surface 808 of second nozzle portion 800, as shown in FIG. 1. Second nozzle portion 800 is substantially conical as shown, although other arrangements of internal components can lead to other practical shapes. A nozzle heater 684 is coupled to the second nozzle portion 800 to provide heat thereto. In the embodiment of FIGS. 9-11, nozzle heater 684 is embedded in grooves provided in an outer surface of second nozzle portion 800, although those skilled in the art would recognize that other ways to heat melt within melt channel 802 and angled melt passages 804 may be used. The nozzle heater 684 is in communication with a power source (not shown) through an electrical connector (not shown). A thermocouple 688 is coupled to second nozzle portion 800 to provide temperature measurements thereof. In the embodiment of FIGS. 9-11, first nozzle portion 668 and second nozzle portion 800 are heated by the independent heaters 685, 684 that can be independently controlled to precisely control the heat profile of the melt. However, as would be understood by one of ordinary skill in the art, a single heater may be used for both first and second nozzle portions 668, 800. Such a single heater can have a wire portion that loosely bridges the gap between the first and second nozzle portions 668, 800, so that the first and second nozzle portions 668, 800 can be separated to allow the nozzle link 680 to be easily removed. Alternatively, the single heater may have a connector to allow separation of the first and second nozzle portions 668, 800.

Nozzle tips or gate seals 806 threadably engage second nozzle portion 800 and include melt passages 812 to deliver melt from radial melt passages 810 to the mold cavities via the mold gates. Each nozzle tip/gate seal 806 is longitudinally fixed in position relative to each respective mold gate and mold cavity. Nozzle tips/gate seals 806 shown in FIGS. 9-11 are of a two-piece construction, however, one of ordinary skill in the art would recognize that one-piece nozzle tips/gate seals as shown in FIGS. 1-5 may be used.

A melt stream of molten material is delivered under pressure from a machine nozzle (not shown) to the manifold channel of the manifold. The melt is distributed from the manifold channel to nozzle melt channels 658 of a plurality of first nozzle portions 668. The melt flows from the nozzle melt channels 658, through melt passages 681 of nozzle links 680 and into the second nozzle melt channels 802. The melt then flows through angled melt passages 804, through radial melt passages 810, through melt passages 812 of gate seals 806, past the gates and into a respective mold cavity. Once the injection portion of the cycle is complete, the molded parts are cooled and ejected from the mold cavities.

In order to control flow of the melt from the manifold, through nozzle 610, and into the mold cavities, a valve pin system is provided. Although not shown in FIGS. 9-11, an actuator as shown in FIG. 1 is provided to move a valve pin 700 axially within nozzle melt channel 658. A head (not shown) of valve pin 700 is coupled to the piston of the actuator. Valve pin 700 extends from the actuator, through the manifold, including a portion of the manifold melt channel, through first melt channel 658 of first nozzle portion 668, through a link melt channel 681 of nozzle link 680, and through second nozzle melt channel 802 of second nozzle portion 800, as shown in FIGS. 9 and 10. Valve pin 700 is disposed within and coaxial with melt channels 658, 681, and 802.

Further, lateral valve pins 704 are provided at least partially within radial melt passages 810 and melt passages 812 of gate seals 806. Lateral valve pins 704 include a tip portion 706 to engage the gate to shut off flow to the respective cavity. Each lateral valve pin 704 also includes a head portion 708 that is seated in a linkage element 710. The linkage element 710 is connected to all of the lateral valve pins 704. In the embodiment of FIGS. 9-11, there are four lateral valve pins 704, as can best be seen in FIG. 11. Linkage element 710 is coupled to valve pin 700 such that axial movement of valve pin 700 along central axis 671 results in lateral movement of lateral valve pins 704 along an axis 705 disposed at an angle with respect to central axis 671 such that the axes are not parallel. In the particular embodiment shown in FIGS. 9-11, axis 705 is perpendicular to central axis 671. However, one of ordinary skill in the art would understand that axis 705 can be disposed at various angles with respect to central axis 671 ranging from 1 degree to 179 degrees. Linkage element 710 is movable within an opening 738 between second nozzle portion 800 and a plate 713.

Linkage element 710 shown in FIGS. 9-11 is a truncated pyramid shape. Each face 712 of linkage element 710 includes a notched slot 711 for receiving a head 708 of a lateral valve pin 704. In this particular embodiment linkage element 710 includes four notched slots 711. As would be understood by one of ordinary skill in the art, faces 712 are not vertical, due to the shape of linkage element 710. Instead, faces 712 are disposed at an angle with respect to central axis 671 such that faces 712 and central axis 671 are not parallel. Due to the angled faces 712, notched slots 711 are also disposed at an angle with respect to central axis 671. This arrangement acts on lateral valve pins 704 such that when valve pin 700 is moved toward plate 713 (away from the actuator), linkage element 710 also moves toward plate 713 thereby causing lateral valve pins to move away from central axis 671, thereby closing the respective gate, as shown in FIG. 10. Similarly, when valve pin 700 is moved away from plate 713, linkage element 710 also moves away from plate 713, causing heads 708 of lateral valve pins 704 to move towards central axis 671, thereby opening the respective gate, as shown in FIG. 9.

Linkage element 710 is coupled to an end 732 of valve pin 700. In particular, linkage element 710 includes an opening 737 for coupling to end 732 of valve pin 700. The opening 737 and the end 732 of valve pin 700 are preferably both threaded for engagement; however thermal bonding, such as brazing or welding, can be used if removability of the valve pin is unimportant. Alternatively, valve pin 700 and linkage element 710 may be made of a unitary piece.

Figure 12:
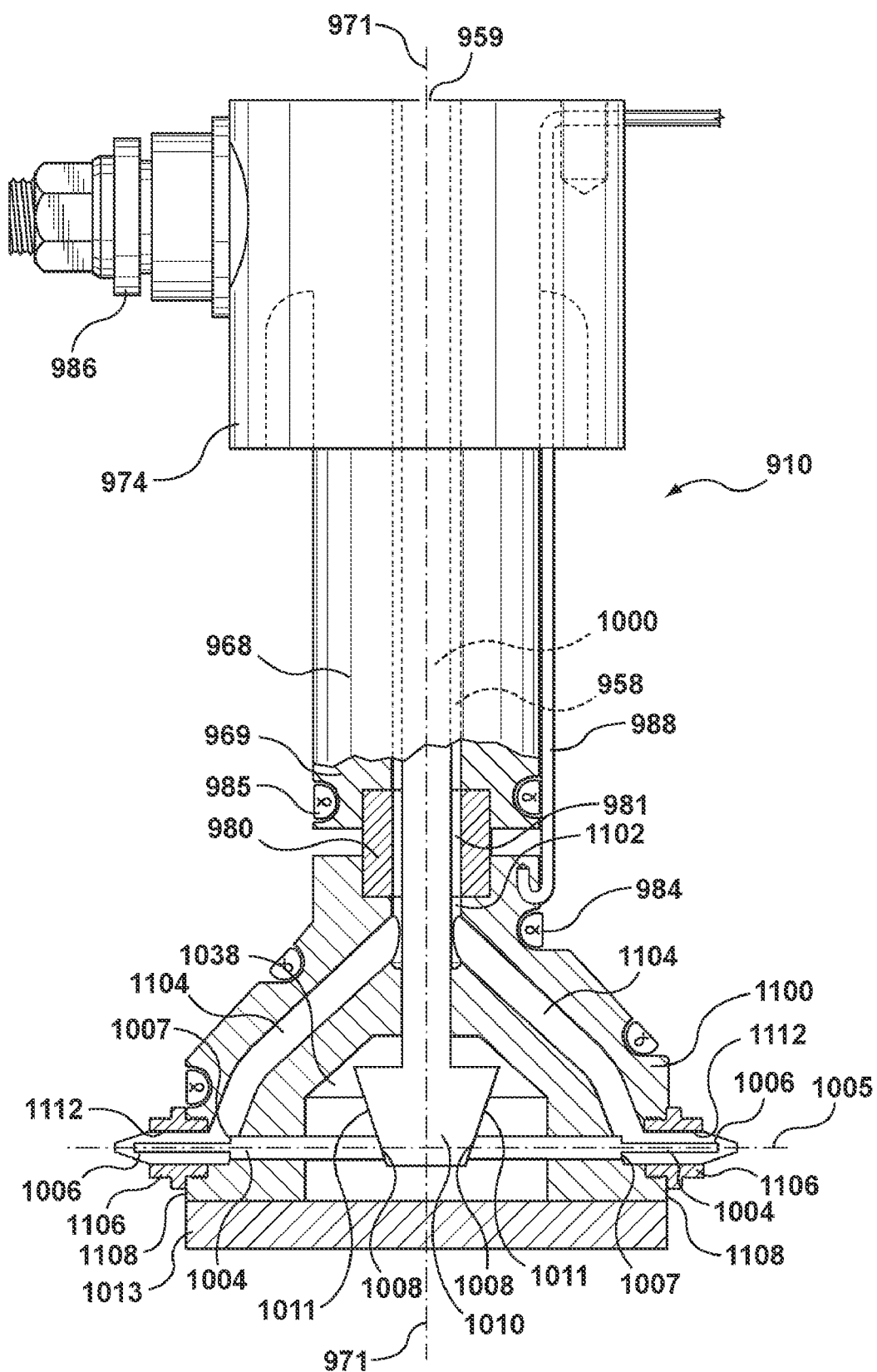
FIG. 12 is a partial cross-sectional view of another embodiment of a nozzle with the valve pins in the open position.
Figure 13:
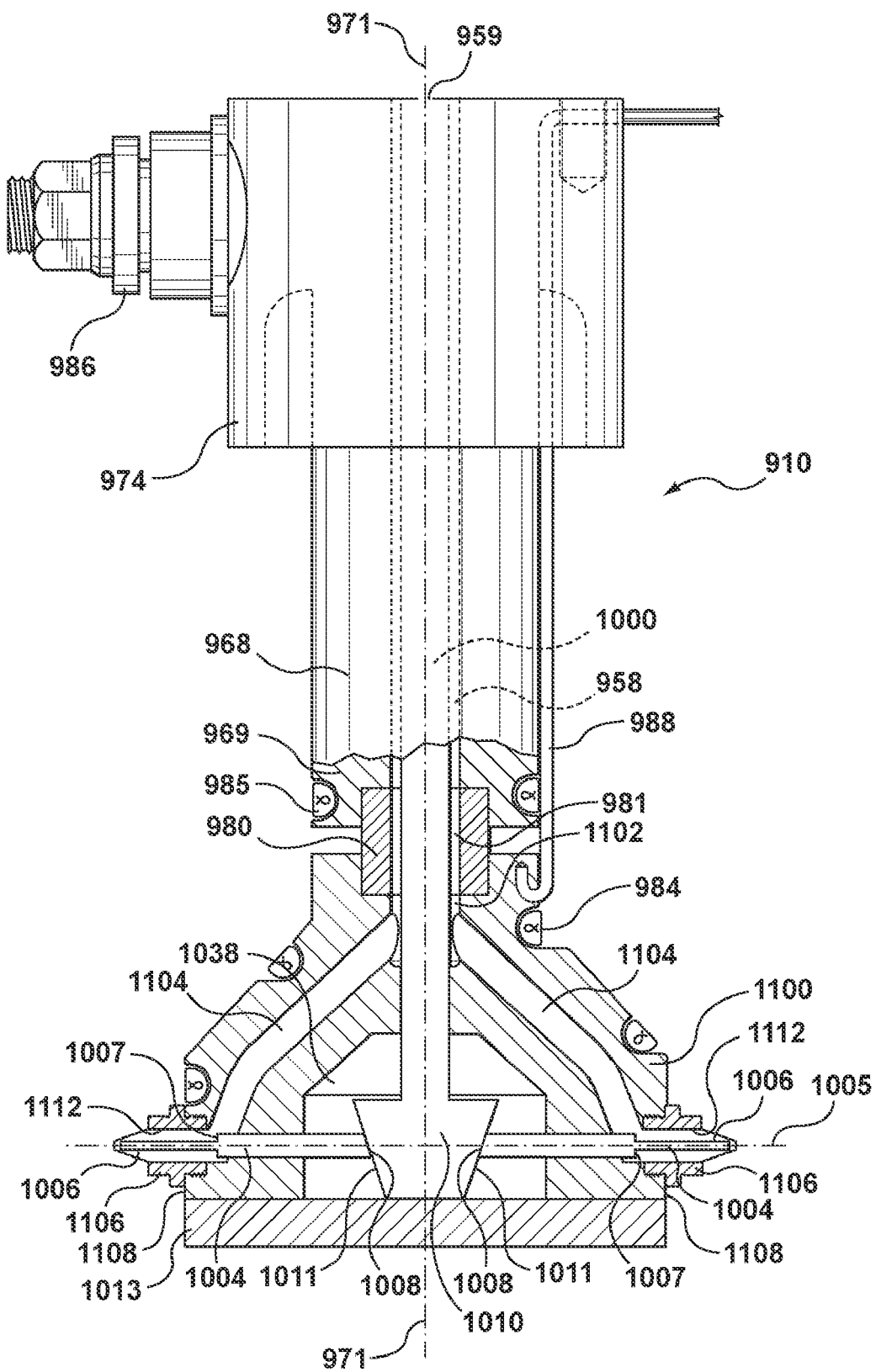
FIG. 13 is a cross-sectional view of the nozzle of FIG. 12 with the valve pins in the closed position.

FIGS. 12-13 show a nozzle 910 made in accordance with another embodiment of the present invention. Nozzle 910 is used in an injection molding apparatus such as the injection molding apparatus 150 shown in FIG. 1. Nozzle 910 is similar to nozzle 10 shown in FIGS. 1-3 in that it includes a first nozzle portion 968 and a second nozzle portion 1100 coupled via a nozzle link 980. However, it would be understood by one of ordinary skill in the art that a unitary nozzle such as nozzle 310 shown in FIGS. 4 and 5 can also be used.

In this embodiment, the first nozzle portion 968 is coupled to a manifold such as manifold 44 shown in FIG. 1. First nozzle portion 968 can be coupled to the manifold by bolts or other means, as described above with respect to FIGS. 1-3. First nozzle portion 968 includes a flange portion 974, as described above with respect to the embodiment of FIGS. 1-3.

First nozzle portion 968 includes a first nozzle melt channel 958 extending therethrough along a central longitudinal axis 971. Melt channel 958 includes an inlet 959 that is aligned with an outlet of a manifold melt channel. A nozzle body 969 of first nozzle portion 968 extends through an opening which extends through a spacer plate and a cavity plate, as described above with respect to FIG. 1. A nozzle heater 985 is coupled about nozzle body 969 of first nozzle portion 968 to provide heat thereto. In the embodiment of FIGS. 12-13, nozzle heater 985 is embedded in grooves provided in an outer surface of nozzle body 969, although those skilled in the art would recognize that other ways to heat melt within melt channel 958 may be used. The nozzle heater 985 is in communication with a power source (not shown) through an electrical connector 986. A thermocouple (not shown) may be coupled to first nozzle portion 968 to provide temperature measurements thereof.

Second nozzle portion 1100 is shown coupled to first nozzle portion 968 by nozzle link 980. Second nozzle portion 1100 includes a second nozzle melt channel 1102 with a plurality of melt passages 1104 that extend at an angle from a forward end of second nozzle melt channel 1102. Angled melt passages 1104 are angled to guide a melt stream toward melt passages 1112 of nozzle tips/gate seal 1106 to deliver melt through mold gates to a series of mold cavities. The mold cavities are radially spaced around nozzle tips/gate seals 1106 coupled to a front surface 1108 of second nozzle portion 1100, as shown in FIG. 1. Second nozzle portion 1100 is substantially conical as shown, although other arrangements of internal components can lead to other practical shapes. A nozzle heater 984 is coupled to the second nozzle portion 1100 to provide heat thereto. In the embodiment of FIGS. 12-13, nozzle heater 984 is embedded in grooves provided in an outer surface of second nozzle portion 1100, although those skilled in the art would recognize that other ways to heat melt within melt channel 1102 and angled melt passages 1104 may be used. The nozzle heater 984 is in communication with a power source (not shown) through an electrical connector (not shown). A thermocouple 988 is coupled to second nozzle portion 1100 to provide temperature measurements thereof. In the embodiment of FIGS. 12-13, first nozzle portion 968 and second nozzle portion 1100 are heated by the independent heaters 985, 984 that can be independently controlled to precisely control the heat profile of the melt. However, as would be understood by one of ordinary skill in the art, a single heater may be used for both first and second nozzle portions 968, 1100. Such a single heater can have a wire portion that loosely bridges the gap between the first and second nozzle portions 968, 1100, so that the first and second nozzle portions 968, 1100 can be separated to allow the nozzle link 980 to be easily removed. Alternatively, the single heater may have a connector to allow separation of the first and second nozzle portions 968, 1100.

Nozzle tips or gate seals 1106 threadably engage second nozzle portion 1100 and include melt passages 1112 to deliver melt angled melt passages 1004 to the mold cavities via the mold gates. Each nozzle tip/gate seal 1106 is longitudinally fixed in position relative to each respective mold gate and mold cavity. Nozzle tips/gate seals 1106 shown in FIGS. 12-13 are of a one-piece construction, however, one of ordinary skill in the art would recognize that two-piece nozzle tips/gate seals as shown in FIGS. 9-11 may be used.

A melt stream of molten material is delivered under pressure from a machine nozzle (not shown) to the manifold channel of the manifold. The melt is distributed from the manifold channel to nozzle melt channels 958 of a plurality of first nozzle portions 968. The melt flows from the nozzle melt channels 958, through melt passages 981 of nozzle links 980 and into the second nozzle melt channels 1102. The melt then flows through angled melt passages 1104, through melt passages 1112 of gate seals 1106, past the gates and into a respective mold cavity. Once the injection portion of the cycle is complete, the molded parts are cooled and ejected from the mold cavities.

In order to control flow of the melt from the manifold, through nozzle 910, and into the mold cavities, a valve pin system is provided. Although not shown in FIGS. 12-13, an actuator as shown in FIG. 1 is provided to move a valve pin 1000 axially within nozzle melt channel 958. A rear head (not shown) of valve pin 1000 is coupled to the piston of the actuator. Valve pin 1000 extends from the actuator, through the manifold, including a portion of the manifold melt channel, through first melt channel 958 of first nozzle portion 968, through a link melt channel 981 of nozzle link 980, and through second nozzle melt channel 1102 of second nozzle portion 1100, as shown in FIGS. 12-13. Valve pin 1000 is disposed within and coaxial with melt channels 958, 981, and 1102.

Further, lateral valve pins 1004 are provided at least partially within melt passages 1112 of gate seals 1106. Lateral valve pins 1004 include a tip portion 1006 to engage the gate to shut off flow to the respective cavity. Each lateral valve pin 1004 also includes a rear surface 1008 that abuts a front head portion 1010 of valve pin 1000. Front head portion 1010 of axial valve pin 1000 is the shape of a truncated pyramid, and includes outer surfaces 1011 that abut rear surfaces 1008 of lateral valve pins 1004. In the embodiment shown in FIGS. 12-13, front head portion 1010 of valve pin 1000 is unitary with valve pin 1000, although those skilled in the art would recognize that they could be separate pieces coupled together by a threaded connection such as shown in FIGS. 9-10, welding, or other bonding. Front head portion 1010 is movable within an opening 1038 between second nozzle portion 1100 and a plate 1013. Movement of axial valve pin 1000 toward plate 1013 cause rear surfaces 1008 of lateral valve pins 1010 to slide along outer surfaces 1011 of head portion 1010, thereby causing lateral valve pins 1010 to move away from central axis 971, thereby closing the respective gate, as shown in FIG. 13. In this embodiment, the gates are opened by melt pressure acting on shoulders 1007 of lateral valve pins 1004 to cause lateral valve pins 1004 to move towards central axis 971. The actuator acting on axial valve pin 1000 to move it towards plate 1013 is either disconnected or overcome by melt pressure acting on shoulders 1007 of lateral valve pins 1004. For example, the actuator may be a spring that biases valve pin 1000 in the closed position (towards plate 1013). Melt pressure acting on shoulders 1007 of lateral valve pins 1004 overcomes the spring force, moving lateral valve pins 1004 towards central axis 971 and opening the gates to the cavities.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    an injection manifold having an inlet and a melt channel, wherein said melt channel branches to a plurality of melt channel outlets;
    a hot runner injection nozzle having an axial melt channel extending along a central axis and communicating with one of the melt channel outlets, the hot runner injection nozzle also including at least two angled melt channels disposed at an angle with respect to the central axis such that the angled melt channels and the axial melt channel are not parallel to each other;
    at least two nozzle tips each including a nozzle tip melt channel, wherein the nozzle tip melt channel is in communication with one of the angled melt channels;
    a primary valve pin disposed at least partially within the axial melt channel coaxially with the central axis and movable within the axial melt channel;
    at least two secondary valve pins movable inside the nozzle tip melt channels, wherein the secondary valve pins are disposed at an angle with respect to the primary valve pin such that the secondary valve pins are not parallel to the primary valve pin;
    a linkage element connecting the secondary valve pins to the primary valve pin; and
    at least two lateral mold gates disposed at an angle with respect to the central axis such that the mold gates are not parallel to the central axis, each mold gate communicating with a mold cavity, wherein the axial movement of the primary valve pin is transmitted through the linkage element to the secondary valve pins to open and close communication between the nozzle tip melt channels and the lateral mold gates.

2. The injection molding apparatus of claim 1, wherein the hot runner injection nozzle includes a first nozzle portion including the axial melt channel and a second nozzle portion including the angled melt channels.

3. The injection molding apparatus of claim 2, wherein the first nozzle portion and the second nozzle portion are separate pieces.

4. The injection molding apparatus of claim 3, further comprising a nozzle link connecting the first nozzle portion to the second nozzle portion.

5. The injection molding apparatus of claim 1, further comprising a heater surrounding the axial melt channel.

6. The injection molding apparatus of claim 5, wherein the heater also surrounds the angled melt channels.

7. The injection molding apparatus of claim 5, further comprising a second independent heater surrounding the angled melt channels.

8. The injection molding apparatus of claim 1, wherein said linkage element includes a slider coupled to each of the secondary valve pins.

9. The injection molding apparatus of claim 8, wherein the sliders of the linkage element are each coupled to a Y-shaped element and the Y-shaped element is coupled to the primary valve pin.

10. The injection molding apparatus of claim 9, wherein the Y-shaped element includes at least two arms and a head portion, wherein each arm is disposed in an angled slot in one of the sliders and the head portion is coupled to the primary valve pin.

11. The injection molding apparatus of claim 1, wherein said linkage element is a truncated pyramid shape and includes a notched slot in side surfaces thereof, wherein each notched slot receives a head of a respective secondary valve pin.

12. The injection molding apparatus of claim 11, wherein said at least two secondary valve pins comprise four secondary valve pins, and said at least two lateral mold gates comprise four lateral mold gates.

13. An injection molding apparatus comprising:
an injection manifold having an inlet and a melt channel;
a hot runner injection nozzle including a first nozzle portion, a separate second nozzle portion, and a nozzle link coupling the first nozzle portion to the second nozzle portion, wherein said first nozzle portion includes an axial melt channel extending along a central axis and communicating with said manifold melt channel, wherein the nozzle link includes a nozzle link melt channel communicating with said axial melt channel, and wherein said second nozzle portion includes at least two angled melt channels disposed at an angle with respect to the central axis such that the angled melt channels and the axial melt channel are not parallel to each other;
at least two nozzle tips each including a nozzle tip melt channel, wherein the nozzle tip melt channel is in communication with one of the angled melt channels;
a primary valve pin generally parallel to the central axis;
at least two secondary valve pins movable inside the nozzle tip melt channels, wherein the secondary valve pins are disposed at an angle with respect to the primary valve pin such that the secondary valve pins are not parallel to the primary valve pin;
a linkage element connecting the secondary valve pins to the primary valve pin; and
at least two lateral mold gates disposed at an angle with respect to the central axis such that the mold gates are not parallel to the central axis, each mold gate communicating with a mold cavity, wherein axial movement of the primary valve pin is transmitted through the linkage element to the secondary valve pins to open and close communication between the nozzle tip melt channels and the lateral mold gates.

14. The injection molding apparatus of claim 13, further comprising a heater surrounding the axial melt channel.

15. The injection molding apparatus of claim 14, wherein the heater also surrounds the angled melt channels.

16. The injection molding apparatus of claim 13, further comprising a second independent heater surrounding the angled melt channels.

17. The injection molding apparatus of claim 13, wherein said linkage element includes a slider coupled to each of the secondary valve pins.

18. The injection molding apparatus of claim 17, wherein the sliders of the linkage element are each coupled to a Y-shaped element and the Y-shaped element is coupled to the primary valve pin.

19. The injection molding apparatus of claim 18, wherein the Y-shaped element includes at least two arms and a head portion, wherein each arm is disposed in an angled slot in one of the sliders and the head portion is coupled to the primary valve pin.

20. The injection molding apparatus of claim 13, wherein said linkage element is a truncated pyramid shape and includes a notched slot in side surfaces thereof, wherein each notched slot receives a head of a respective secondary valve pin.

21. The injection molding apparatus of claim 20, wherein said at least two secondary valve pins comprise four secondary valve pins, and said at least two lateral mold gates comprise four lateral mold gates.

22. The injection molding apparatus of claim 13, wherein said primary valve pin is disposed at least partially within the axial melt channel coaxially with the central axis and is movable within the axial melt channel.

23. An injection molding apparatus comprising:
an injection manifold having an inlet and a melt channel, wherein said melt channel branches to a plurality of melt channel outlets;
a hot runner injection nozzle having an axial melt channel extending along a central axis and communicating with one of the melt channel outlets, the hot runner injection nozzle also including at least two angled melt channels disposed at an angle with respect to the central axis such that the angled melt channels and the axial melt channel are not parallel to each other;
at least two nozzle tips each including a nozzle tip melt channel, wherein the nozzle tip melt channel is in communication with one of the angled melt channels;
a primary valve pin disposed parallel to the central axis;
at least two secondary valve pins movable inside the nozzle tip melt channels, wherein the secondary valve pins are disposed at an angle with respect to the primary valve pin such that the secondary valve pins are not parallel to the primary valve pin;
at least two sliders, each slider being coupled to a respective one of the secondary valve pins such that said sliders move generally parallel to said secondary valve pins;
a linkage element coupling the sliders to the primary valve pin; and
at least two lateral mold gates disposed at an angle with respect to the central axis such that the mold gates are not parallel to the central axis, each mold gate communicating with a mold cavity, wherein the axial movement of the primary valve pin is transmitted through the linkage element and the sliders to the secondary valve pins to open and close communication between the nozzle tip melt channels and the lateral mold gates.

24. The injection molding apparatus of claim 23, wherein the linkage element is Y-shaped.

25. The injection molding apparatus of claim 24, wherein the Y-shaped element includes at least two arms and a head portion, wherein each arm is disposed in an angled slot in one of the sliders and the head portion is coupled to the primary valve pin.

26. The injection molding apparatus of claim 23, wherein the hot runner injection nozzle includes a first nozzle portion including the axial melt channel and a second nozzle portion including the angled melt channels.

27. The injection molding apparatus of claim 26, wherein the first nozzle portion and the second nozzle portion are separate pieces.

28. The injection molding apparatus of claim 27, further comprising a nozzle link connecting the first nozzle portion to the second nozzle portion.

29. The injection molding apparatus of claim 23, further comprising a heater surrounding the axial melt channel.

30. The injection molding apparatus of claim 29, wherein the heater also surrounds the angled melt channels.

31. The injection molding apparatus of claim 29, further comprising a second independent heater surrounding the angled melt channels.

32. The injection molding apparatus of claim 23, wherein said primary valve pin is disposed at least partially within the axial melt channel coaxially with the central axis and is movable within the axial melt channel.

* * * * *